US006678775B1

United States Patent
Zink

(12) United States Patent
(10) Patent No.: US 6,678,775 B1
(45) Date of Patent: Jan. 13, 2004

(54) SYSTEM ENABLING AUTOMATIC ERROR DETECTION IN RESPONSE TO REMOVAL OF BUS ADAPTER

(75) Inventor: Daniel J. Zink, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 09/751,049

(22) Filed: Dec. 29, 2000

(51) Int. Cl.$^7$ ............................................. G06F 13/00
(52) U.S. Cl. ..................... 710/301; 710/302; 710/303; 710/304
(58) Field of Search .................. 710/301–304, 710/100

(56) References Cited

U.S. PATENT DOCUMENTS

| | | | | |
|---|---|---|---|---|
| 6,012,114 A | * | 1/2000 | Autor et al. .............. 710/302 |
| 6,012,144 A | * | 1/2000 | Pickett ..................... 713/201 |
| 6,047,343 A | * | 4/2000 | Olarig ...................... 710/302 |
| 6,055,596 A | * | 4/2000 | Cepulis .................... 710/104 |
| 6,175,888 B1 | * | 1/2001 | Guthrie et al. ........... 710/310 |
| 6,182,173 B1 | * | 1/2001 | Grosser et al. ........... 710/302 |
| 6,363,452 B1 | * | 3/2002 | Lach ........................ 710/316 |
| 6,557,068 B2 | * | 4/2003 | Riley et al. .............. 710/306 |

* cited by examiner

Primary Examiner—Mark H. Rinehart
Assistant Examiner—Kim T. Huynh

(57) ABSTRACT

A hot pluggable bus in a computer system includes one or more slots for receiving hot pluggable bus adapters and a hot plug controller also coupled to the bus. When a mechanical member associated with a slot is actuated by the user, a signal is sent to the hot plug controller to indicate that the user is about to remove the bus adapter. At that time, the hot plug controller programs a control register to enable a system error signal to thereafter permit the hot plug controller to assert the system error signal when it detects a master abort pertaining to an attempted transaction to the slot which is vacated by the user removing the bus adapter from the slot.

20 Claims, 1 Drawing Sheet

SYSTEM ENABLING AUTOMATIC ERROR DETECTION IN RESPONSE TO REMOVAL OF BUS ADAPTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system with a hot pluggable bus. More particularly, the invention relates to a hot pluggable bus for which a user normally alerts the computer before removing a bus adapter. Still more particularly, the invention relates to a computer system that can accommodate the removal of a bus adapter before the user alerts the system that the adapter is about to be removed.

2. Background of the Invention

A personal computer system includes a number of components with specialized functions that cooperatively interact to produce the many effects available in modem computer systems. The ability of these various components to exchange data and other signals is vital to the successful operation of a computer system. Typically, components interact by reading or writing data or instructions to other components in the system.

Early computer systems typically included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Traditionally, the CPU controlled most activities in the computer system. The CPU supervises data flow and is responsible for most of the high-level data modification in the computer. The CPU, therefore, is the "brain" of the system and receives signals from the peripheral devices, reads and writes data to memory, processes data, and generates signals controlling the peripheral devices.

Despite the importance of the processor, the performance of the computer system is determined only in part by the speed and efficiency of the processor. Other factors also affect system performance. One of the most critical factors is the bus that interconnects the various system components. Computers today typically have multiple buses. The size and clock speed of a bus dictate the maximum amount of data that can be transmitted between components. Early bus systems, such as the ISA (Industry Standard Architecture) bus, required that all components communicate through the CPU. The ISA bus, as the name implies, was a bus standard adopted by computer manufacturers to permit the manufacturers of peripheral devices to design devices that would be compatible with most computer systems.

Since the introduction of the ISA bus, computer technology has continued to evolve at a relatively rapid pace. New peripheral devices have been developed, and both processor speeds and the size of memory arrays have increased dramatically. In conjunction with these advances, designers have sought to increase the ability of the system bus to transfer more data at a faster speed. One way in which the system bus has been made more effective is to permit data to be exchanged in a computer system without the assistance of the CPU. To implement this design, however, a new bus protocol had to be developed. One of the first such buses that permitted peripheral devices to run master cycles independently of the CPU was the EISA (Extended Industry Standard Architecture) bus. The EISA bus enables various system components residing on the EISA bus to obtain mastership of the bus and to run cycles on the bus.

More recently, the Peripheral Component Interconnect (PCI) bus has become increasingly popular. Like the EISA bus, the PCI bus has bus master capabilities, and thus certain master components on the PCI bus may communicate directly with other PCI components by addressing read and write commands to these other components based on protocols defined in the PCI Specification that has been developed by the industry. Because of the bus mastering capabilities and other advantages of the PCI bus, many computer manufacturers now implement the PCI bus as the main system bus in the computer system.

The PCI bus standard has also evolved to provide for "hot plug" capability. Hot plug generally refers to being able to install or remove an expansion card from a computer while the computer is operating. PCI hot plug permits a PCI card in particular to be added to or removed from a PCI bus while the rest of the computer continues to operate. By contrast, before the advent of hot plug, a user wishing to replace an expansion card had to shut down the computer, remove the old card, install the new card, and then reboot the system—time consuming and inconvenient.

With a hot plug capability of a PCI bus and with the computer fully operational, a user can simply remove the old card and install a new card and not have to shut down and then reboot the computer. In accordance with the PCI bus hot plug specification, however, the user must alert the computer's software before removing a PCI card. This process generally entails the user notifying a hot plug service routine of the user's desire to remove a card from a particular slot. The service routine then uses various operating system functions to "quiesce" the software driver associated with the PCI card the user desires to remove. Quiescing means that all communications between the PCI card to be removed and the rest of the computer system are discontinued. In addition to directing the system not to initiate any new transactions to the PCI card to be removed, a reset signal is also asserted to the PCI device to prevent it from attempting to communicate with the rest of the system. The hot plug service routine then causes power to the slot to be turned off. At this point, the user can remove the PCI device.

These steps are generally reversed to add a card to a hot plug PCI bus. The user first installs the card in a vacant PCI slot and then notifies the hot plug service routine that a new card is present and should be turned on. The system responds by powering on the slot and permitting communications to occur to or from the newly installed PCI card.

Of particular note in the PCI hot plug implementation is that the user must notify the software when a card is being removed. This notification should occur before the user actually removes the card, not after. Of course, there generally is no physical impediment to prevent a user from removing a PCI card before alerting the software. Consequently, however, if a user was to remove a PCI card from a PCI hot plug capable bus with the computer's processor not being aware that the target PCI card is missing, the processor may improperly attempt to communicate with the missing card. In this case an error will occur. The attempted communication to the slot, now vacant, will not complete because no PCI card is present to respond to the attempted transaction. The logic that initiates the transaction will eventually time out (also referred to as a "master abort" event) when it determines that the target PCI device has not responded. By convention, if the attempted transaction is a read (e.g., the processor attempting to read a register on a PCI device), all logic Is will be returned to the processor as the requested data. Receiving all Is, the processor may process that data not realizing that the data is incorrect, thereby creating an error in system behavior.

One suggested solution to the problem of a user removing a PCI card without first alerting software is to use a PCI bus system error (SERR) signal in response to a master abort event. The logic that times out upon failing to detect the presence of the target PCI card asserts the SERR signal which causes the entire system to shut down. Although shutting down the entire system may seem drastic, that usually is preferred over the system continuing to operate but receiving and processing incorrect data. Although generally satisfactory, this approach itself creates a problem.

In certain situations, it may be normal and, in fact, desired for the processor to attempt a transaction to a vacant PCI slot. For example, during the boot up process, the processor may initiate an enumeration sequence during which communications to each of the PCI slots, vacant or not, are attempted to determine what, if any, PCI devices are present in the system. As such, if a device is present in a slot, it will respond and the system will then know that a device occupies that slot. However, if no response is received from a slot, the computer will determine that the slot is vacant and configure itself to avoid any further communications to that slot. This is the general manner in which the system determines what hardware is present on the PCI bus.

During this enumeration process, it obviously would be inappropriate for the system to respond to an attempted communication with a vacant PCI slot by asserting the SERR signal and causing the system to shut down, which would be the result with the master abort/SERR solution. Because of certain situations in which communications to a vacant slot are intended and normal, the master abort/SERR solution to the problem of a user removing a PCI card before alerting software is generally unworkable.

It would be desirable if a system was available that can solve the problem caused by a user incorrectly removing an expansion card before alerting software. Such a solution should also permit the system, during various normal situations, to attempt a communication with a vacant slot without resetting or otherwise crashing the system.

BRIEF SUMMARY OF THE INVENTION

The present invention solves the deficiencies of the prior art by providing a hot pluggable bus (e.g., a PCI bus) in a computer system that includes one or more slots for receiving hot pluggable bus adapters and a hot plug controller also coupled to the bus. Further, a host bridge may be included to provide a bridge through which a processor may communicate with the bus adapters. The hot plug controller includes a control register that can be programmed to enable and disable a system error signal to the processor. Preferably, the system error signal is normally disabled.

Each slot includes a connector for receiving a mating connector on the bus adapter. Each slot also includes a mechanical or electro-mechanical member to permit a user to notify the system when the user desires to remove the bus adapter presently residing in the slot. When the mechanical member is actuated by the user, a signal is sent to the hot plug controller to indicate that the user is about to remove the bus adapter. In response, the hot plug controller programs the control register to enable the system error signal to thereafter permit the hot plug controller to assert the system error signal when desired. The hot plug controller also causes power to be turned off to the slot for which the user is about to remove the bus adapter and the hot plug controller sends a notification to the computer's software that the bus adapter is about to be removed.

The hot plug controller then monitors the bus for a master abort cycle pertaining to an attempted transaction to the slot which has now been vacated by the user removing the bus adapter. When the hot plug controller detects such a master abort, the controller asserts the system error signal which causes the processor to halt the computer system. If, however, the hot plug controller is informed that the computer's software has quiesced the slot and, in the interim time period, has not detected a master abort, the hot plug controller disables its system error signal.

In this manner, the system error signal is preferably only enabled during relatively short periods of time including when a bus adapter is present in a slot but is about to be removed by a user through the time that software is informed of such event and quiesces the slot. Most of the time, the system error signal is disabled, thereby not causing a conflict with normal system behavior. These and other benefits will become apparent upon reviewing the following description.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
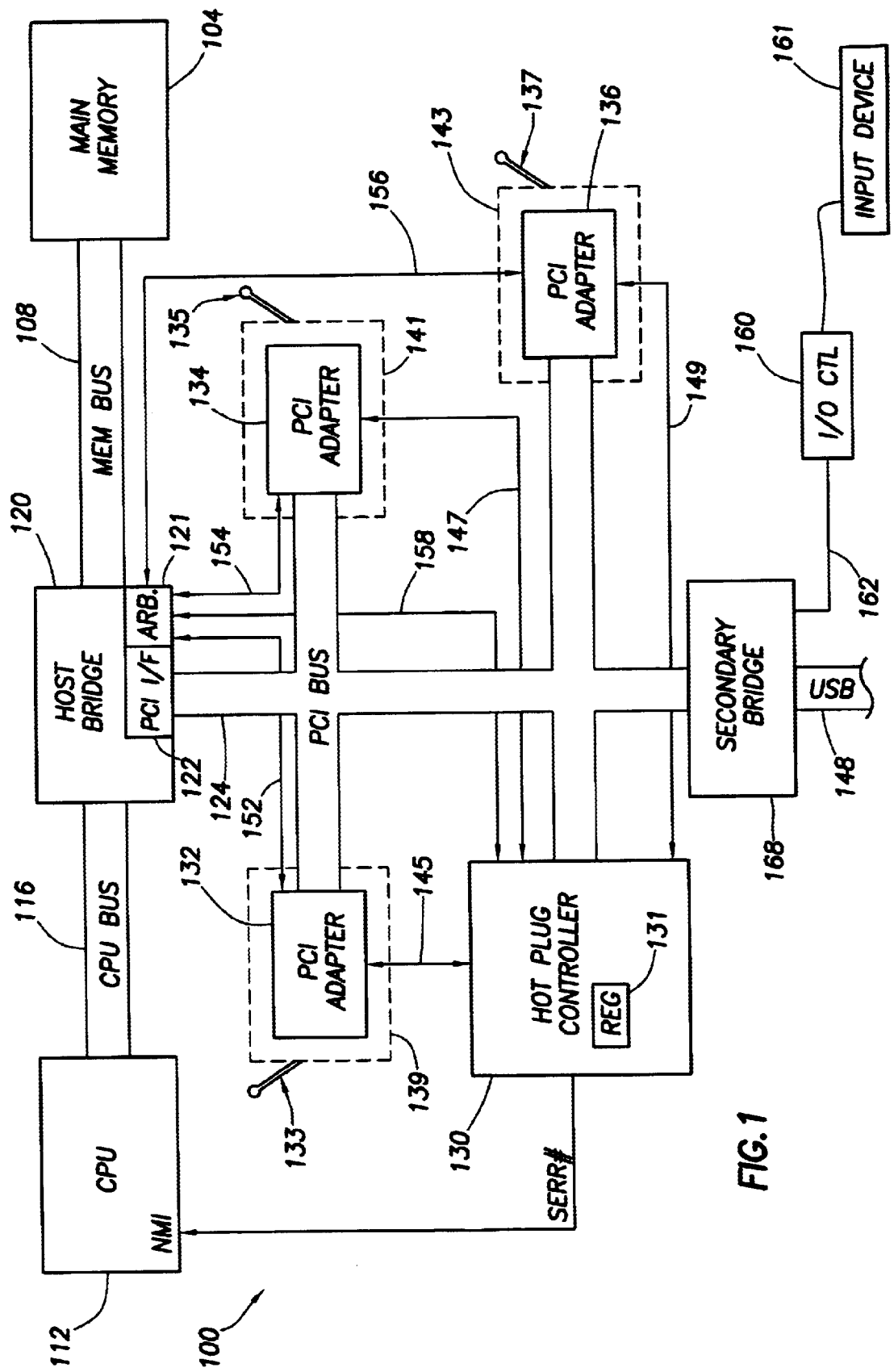
FIG. 1 depicts a computer system implementing the preferred embodiment of the invention.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

The term "computer" is used in this specification broadly and includes a personal computer, workstation, server, or other microprocessor-based device which can be programmed by a user to perform one or more functions and/or operations. The term "PCI adapter" refers broadly to any PCI-compliant device implemented as an application specific integrated circuit (ASIC), module, circuit card, and the like. To the extent that any term is not specially defined in this specification, the intent is that the term is to be given its plain and ordinary meaning.

DETAILED DESCRIPTION OF THE PREFERRED EMBODIMENTS

FIG. 1 illustrates a computer system 100 constructed in accordance with a preferred embodiment. Computer system 100 generally comprises a microprocessor or CPU 112 coupled to a main memory array 104 and a variety of other peripheral computer system components through an integrated host bridge logic device 120. The CPU 112 preferably couples to host bridge 120 via a CPU bus 116, or the host bridge 120 may be integrated into the CPU 112. The CPU 112 may comprise, for example, a Pentium® III microprocessor. It should be understood, however, that computer system 100 could include other alternative types of microprocessors. Further, an embodiment of computer system 100 may include multiple processors, with each processor coupled through the CPU bus 116 to the bridge logic unit 120.

The main memory array 104 preferably couples to the bridge logic unit 120 through a memory bus 108, and the host bridge 120 preferably includes a memory control unit (not specifically shown) that controls transactions to the main memory 104 by asserting the necessary control signals during memory accesses. The main memory 104 functions as the working memory for the CPU 112 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

Referring still to FIG. 1, a secondary bridge 168 preferably connects to the host bridge 120 via an expansion bus 124. The secondary bridge 168 couples or "bridges" the primary expansion bus 124 to other secondary expansion buses. These other secondary expansion buses may include a USB (Universal Serial Bus), an IDE bus, an IEEE 1394 standard (or "FireWire") bus, or any of a variety of other buses that are available or may become available in the future. As will be apparent to one skilled in this art, various peripheral devices may be coupled to each of these buses. Further, an input/output (I/O) controller 160 also couples to secondary bridge 168 via signal lines 162. The I/O controller 160 preferably interfaces various input devices, including a mouse 161, a keyboard, a floppy disk drive, and various input switches such as a power switch and a suspend switch.

As noted above, the computer system 100 also includes a bus 124 that couples together various devices. In the preferred embodiment shown in FIG. 1, the expansion bus 124 comprises a Peripheral Component Interconnect (PCI) bus and coupled together various PCI bus-compliant adapters 132, 134, and 136. Computer system 100, however, is not limited to any particular type of expansion bus, and thus various buses may be used, including a high speed (66 MHz or faster) PCI bus. Thus, although the preferred embodiment of the invention will be described in terms of PCI bus-compliant adapters, the principles described herein can easily be extended to any type of hot plug capable bus in which the user should alert software before removing a device connected to the bus.

As shown, the host bridge 120 preferably includes a PCI bus interface 122 and PCI bus arbitration logic 121. Although the arbitration logic 121 is shown integrated with the host bridge 120, that need not be the case and the arbitration logic 121 may included in the computer system 100 as a separate component or integrated into another component, such as hot plug controller 130. The arbitration logic 121 receives arbitration request signals from the various PCI adapters 132, 134, 136, hot plug controller 130 and the host bridge 120 itself via signal lines 152, 154, 156, and 158, respectively (request signal from internal host bridge logic not shown). In accordance with suitable arbitration rules dictating which device should be given control of the PCI bus 124, the arbitration logic 121 grants mastership to the device that wins arbitration. That decision is encoded in a grant signal which is part of signals 152, 154, 156, and 158. Whichever device wins arbitration can then proceed with its transaction on the PCI bus 124.

The PCI adapters 132, 134, and 136 preferably include any type of peripheral devices, such as network interface cards (NICs), graphics controllers, video accelerators, audio cards, hard or floppy disk controllers, Personal Computer Memory Card International Association (PCMCIA) controllers, Small Computer Systems Interface (SCSI) adapters, telephony cards, and others. Further, any number (one or more) of PCI adapters can be included in the computer system.

Each PCI adapter 132, 134, 136 preferably is installed into a corresponding slot 139, 141, and 143. Each slot includes a connector that mates with a corresponding connector on the PCI adapter and thus provides an electrical and mechanical interface between the adapter and the computer system 100.

The PCI bus 124 in FIG. 1 preferably has hot plug capability. To implement this capability, computer system 100 preferably also includes a hot plug controller 130. Hot plug controller 130 connects to the various hot plug PCI adapters 132, 134, 136 via signals 145, 147 and 149. These signals are used to electrically isolate a corresponding slot 139, 141, 143 from the PCI bus 124 when removing a PCI adapter. Hot plug controller 130 preferably is capable of generating an output signal system error signal (SERR#) that is an active low signal. The use of the this signal will be described below. As shown, the SERR# may be provided directly to a non-maskable interrupt (NMI) input signal on CPU 112. Alternatively, SERR# may be provided to other logic, such as host bridge 120 or other logic not shown, and such other logic may generate the NMI to CPU 112. In any case, when the hot plug controller 130 asserts SERR#, an NMI (or other suitable interrupt) is asserted to the CPU 112. The hot plug controller 130 preferably also includes a control register 131.

This register includes a writeable bit that enables or disables the SERR# generating capability of the hot plug controller 130. Setting this bit causes the output driver (not specifically shown) which drives the SERR# output signal to be enabled. Clearing the bit causes the output driver to be disabled thereby preventing the hot plug controller 130 from asserting SERR#.

Referring still to FIG. 1, each slot 139, 141, 143 preferably also includes a mechanical or electromechanical member 133, 135, and 137 that can be mechanically actuated by a user. The mechanical members may comprise, for example, levers that can be flipped from one position to another and back. When actuated, this mechanical member causes a signal (145, 147, 149) to be asserted to the hot plug controller 130 to alert the hot plug controller that a user is about to remove the PCI adapter in the slot in which the mechanical member was actuated.

In accordance with the PCI Hot Plug specification, a user generally must first alert a hot plug service routine of his desire to remove a PCI adapter. That process was described above. The use of the aforementioned structure, however, to solve the problem whereby a user removes a PCI adapter before alerting appropriate software will now be explained.

In accordance with a preferred embodiment of the invention, control register 131 in the hot plug controller 130 preferably is normally programmed so that the controller's SERR# output signal capability is disabled for Master Abort conditions. As such, hot plug controller 130 normally cannot assert SERR# to the processor 112 due to a Master Abort condition on the PCI bus 124. However, when a mechanical member 133, 135, 137 is actuated, indicating an imminent PCI adapter 132, 134, 136 removal, the control register 131 is programmed to enable the controller's SERR# signal capability for Master Abort. Taking the PCI adapter 134 and mechanical member 135 as an example, when a user desires to remove PCI adapter 134, the user must first actuate mechanical member 135. This action causes a signal 147 to be sent to the hot plug controller 130 indicating that the mechanical member 135 has been actuated. In response to that signal, the hot plug controller reprograms control register 131 to enable SERR# on Master Abort and shuts down slot 141. Shutting down slot 141 includes turning power signals off to the slot and requesting the control logic to tristate its output signals and ignore any input signals.

The hot plug controller 130 then also begins a process to notify the hot plug service routine (not specifically shown) that the PCI adapter 134 is about to be removed. This process generally takes a significant amount of time to complete. Before the software can be notified that PCI adapter 134 is about to be removed, the user may already have removed PCI adapter 134. In this case, another process in the computer system 100 may attempt a transaction targeting PCI adapter 134. For example, the CPU 112 may attempt a read from adapter 134. Because software may not have yet been notified that the PCI adapter 134 is unavailable, the read transaction to slot 141 may be attempted anyway by host bridge 120 on behalf of CPU 112.

Host bridge 120 will request mastership of the PCI bus 124 from the arbitration logic 121. The arbitration logic 121 may grant mastership of the bus to the host bridge 120 and the host bridge will then attempt to communicate with the PCI adapter 134 (which by now may have been removed by the user). Eventually, when the host bridge 120 receives no response from the PCI adapter 134, the host bridge 120 will perform a master abort. In accordance with the preferred embodiment, the hot plug controller 130, already aware that the user was about to remove the adapter, watches for cycles on the PCI bus 124 targeting slot 141 that are aborted by the master of the transaction (in this case the host bridge 120). Then, when the hot plug controller 130 detects such a master abort, the hot plug controller asserts its SERR# signal to the CPU 112 which causes the CPU to be immediately notified via NMI.

In further accordance with the preferred embodiment of the invention, the hot plug controller 130 programs control register 131 to disable its SERR# on Master Abort signal capability when the software finally quiesces the software driver associated with the PCI adapter 134. Accordingly, when the hot plug controller 130 detects or is informed that the computer system's software has taken its appropriate steps to discontinue further communications with the PCI adapter 134 in slot 141, the hot plug controller disables its SERR# on Master Abort ability. As such, the hot plug controller's 130 SERR# on Master Abort ability is enabled preferably for as short of time period as possible surrounding the event in which the user actuates mechanical member 135 and removes PCI adapter 134.

Thus, rather than returning all Is to the CPU 112 following a master abort by host bridge 120 in accordance with conventional procedure, the system 100 is halted altogether. This is usually a preferred response over continuing to operate with incorrect data from the host bridge 120. Also, because the SERR# on Master Abort ability is only enabled in a relatively short period of time surrounding the removal of a PCI adapter, the likelihood of a Master Abort due to a transaction not targeting the slot 141 is greatly reduced.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
    a CPU;
    an input device coupled to said CPU;
    a host bridge coupled to said CPU and to a hot pluggable bus;
    a hot pluggable bus adapter coupled to said bus; and
    a hot plug controller coupled to said bus and via a system error signal to said CPU, said hot plug controller including a programmable control register through which said system error signal can be enabled and disabled;
    wherein the hot plug controller is adapted to assert the system error signal when the CPU initiates a communication with the bus adapter after a user has removed the bus adapter from the computer system, and an asserted system error signal causes the computer system to shut down;
    wherein said control register is programmed to permit said system error signal to be asserted when a user provides a positive indication of a desire to remove said bus adapter.

2. The system of claim 1, wherein said bus adapter mates with a slot that has an associated mechanical member, said mechanical member can be actuated by a user when the user desires to remove the bus adapter and when so actuated causes an actuation signal to be asserted to said hot plug controller to indicate the actuation.

3. The system of claim 2, wherein said hot plug controller programs said control register to permit said system error signal to be asserted when said hot plug controller detects the assertion of said actuation signal.

4. The system of claim 1, wherein when the user provides a positive indication of a desire to remove said bus adapter, said hot plug controller also causes said bus adapter to be turned off and informs software in said computer system that said bus adapter is about to be removed.

5. The system of claim 4, wherein said hot plug controller programs said control register to prevent said system error signal from being asserted when said software has quiesced said bus adapter.

6. The system of claim 1 further including a plurality of hot pluggable bus adapters.

7. The system of claim 1, wherein said hot plug controller monitors said bus for a master abort when said system error signal is permitted to be asserted, and upon detecting such a master abort, said hot plug controller asserts said system error signal.

8. The system of claim 7, wherein said CPU receives said asserted system error signal and, in response, halts said computer system.

9. The system of claim 1, wherein said bus comprises a hot pluggable PCI bus.

10. A hot pluggable subsystem, comprising:
   a hot plug controller coupled to a bus;
   a slot connector coupled to said bus and configured to receive a hot pluggable bus adapter and including a mechanical member that a user actuates to remove a bus adapter mated to the slot connector;
   a control register coupled to said bus and programmable to enable and disable generation of a system error signal;
   said control register is programmed to enable generation of said system error signal after said mechanical member is actuated by a user.

11. The hot pluggable subsystem of claim 10, wherein a user actuates said mechanical member to remove a bus adapter mated with said slot connector, said hot plug controller also causes power to said slot to be turned off and informs software that said bus adapter is about to be removed.

12. The hot pluggable subsystem of claim 11, wherein said hot plug controller programs said control register to disable said system error signal when informed that said slot has been quiesced.

13. The hot pluggable subsystem of claim 10, wherein said control register resides within said hot plug controller.

14. The hot pluggable subsystem of claim 10, wherein said hot pluggable system bus comprises a PCI hot pluggable bus.

15. The hot pluggable subsystem of claim 10, wherein said hot pluggable bus controller watches for a master abort on said system bus when said system error signal is enabled.

16. The hot pluggable subsystem of claim 15, wherein, upon detecting said master abort, said hot plug controller asserts said system error signal.

17. A method of managing a cycle to a vacant slot in a hot pluggable bus, comprising:
   receiving a positive indication that a user is about to remove a bus adapter from said hot pluggable bus;
   enabling generation of a system error signal upon reception of the positive indication;
   watching for a master abort on said hot pluggable bus to said vacant slot; and
   upon detecting said master abort, asserting said system error signal.

18. The method of claim 17 further including informing software that a positive indication that a user is about to remove a bus adapter from said hot pluggable bus has been received.

19. The method of claim 18, further including disabling generation of said system error signal after informing said software.

20. The method of claim 18, further including disabling generation of said system error signal after informing said software and after said software has precluded further communications with said bus adapter.

* * * * *